United States Patent [19]
Schafer et al.
[11] Patent Number: 4,971,473
[45] Date of Patent: Nov. 20, 1990

[54] BALL-AND-SOCKET JOINT FOR MOTOR VEHICLES

[75] Inventors: Burkhard Schafer, Lemförde; Reinhard Buhl, Bohmte, both of Fed. Rep. of Germany

[73] Assignee: Lemförder Metallwaren AG, Lemförde, Fed. Rep. of Germany

[21] Appl. No.: 398,148

[22] Filed: Aug. 24, 1989

[30] Foreign Application Priority Data

Aug. 24, 1988 [DE] Fed. Rep. of Germany ....... 3828683

[51] Int. Cl.[5] ............................................ F16C 11/06

[52] U.S. Cl. .................................. 403/140; 403/135; 403/39

[58] Field of Search ......................... 403/135, 140, 39; 384/213

[56] References Cited

U.S. PATENT DOCUMENTS 3,787,127 1/1974 Cutler ............................ 403/140 X
3,856,423 12/1974 Uchida ............................... 403/140
4,318,627 3/1982 Morin ............................ 403/140 X
4,430,016 2/1984 Matsuoka et al. .............. 403/140 X
4,577,988 3/1986 Gollub et al. ....................... 403/140
4,577,989 3/1986 Ito ....................................... 403/140

FOREIGN PATENT DOCUMENTS 1417407 12/1975 United Kingdom ................ 403/140

*Primary Examiner*—Andrew V. Kundrat
*Attorney, Agent, or Firm*—McGlew & Tuttle

[57] ABSTRACT

A ball-and-socket joint for motor vehicles includes a joint ball (1) provided on a pivot pin (2) mounted movably in a sliding shell (4) made of plastic. A zone of grooves (8) are provided for receiving lubricant on an inner surface of the sliding shell. The sliding shell is inserted into a housing (5) whose inner wall closely surrounds the outer wall of the sliding shell (4). In the zone of the grooves receiving the lubricant, flat recesses (9), which permit radial deformation of the sliding shell (4) in the direction toward the housing, are provided between the housing (5) and the sliding shell (4).

5 Claims, 2 Drawing Sheets

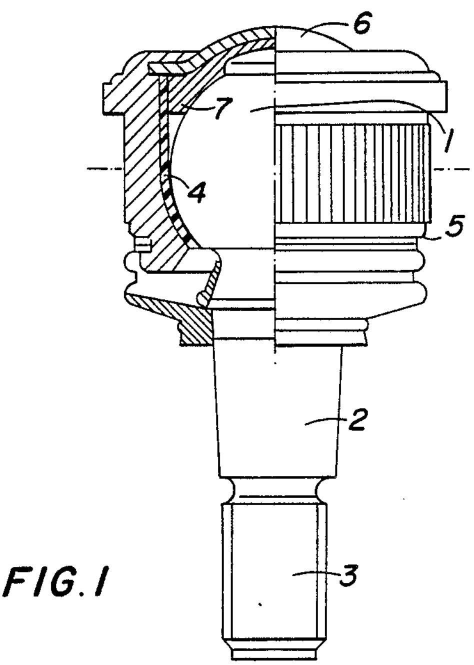
FIG. 1
FIG. 3
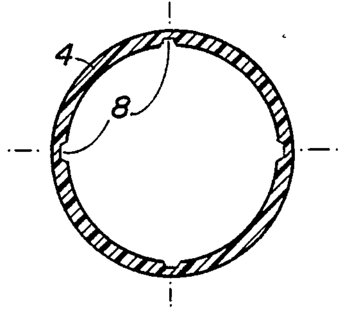
FIG. 2
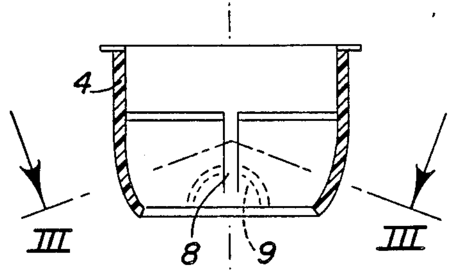

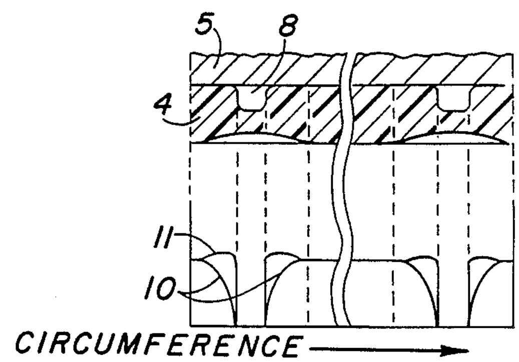
FIG. 4
FIG. 5
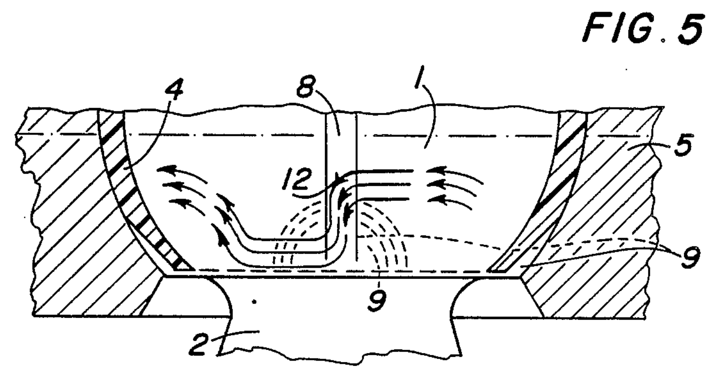

BALL-AND-SOCKET JOINT FOR MOTOR VEHICLES

FIELD OF THE INVENTION

The present invention pertains in general to ball-and-socket joints for motor vehicles and more particularly to a joint ball provided on a pivot pin in a sliding shell made of plastic which joint ball is mounted movably, wherein the inner surface of the sliding shell is provided with grooves receiving lubricant and is inserted into a housing, the inner wall of which closely surrounds and supports the outer wall of the sliding shell.

BACKGROUND OF THE INVENTION

Such ball-and-socket joints, in which the joint ball is fitted in a joint socket made of wear-resistant plastic with limited elasticity, and is inserted with the joint socket into a housing, are described in West German Auslegeschrift No. 15,75,539. Instead of the slots in the joint socket, which are described in this publication, grooves provided on the inner wall of the joint socket are known from West German Auslegeschrift No. 10,14,441 and West German Auslegeschrift No. 24,56,571. Lubricant greases, which are fed to the bearing areas of the joint via the slots or via the lubricant grooves of the joint socket, are used to bring about a general reduction of friction and wear in the bearing.

It has been found in the course of many years of use of these ball-and-socket joints, which possess good articulation properties per se, that thickened areas are formed in the socket wall. These thickened areas form at the transition to the slot or to the lubricant groove, due to manufacturing reasons, during the manufacture of injection molds for the joint sockets and due to the shrinkage of the plastic during the injection molding of the joint shells. In the assembled state of the ball-and-socket joint, these thickened areas lead to partially increased surface pressures, which pressures cause the grease to be stripped off during the movement of the joint ball in the joint socket. The bearing zones of the ball-and-socket joint are thus deprived of grease, so that the opposite of the intended effect is achieved. This is prevented in a prior-art design according to West German Design Patent No. 74,24,445 by the joint having a very thin joint shell without lubricant grooves in the bearing surface and being supported against the housing by ribs or the like arranged on the outside of the joint shell.

Another problem lies in the fact that increasingly exacting requirements have been imposed on the components, especially ball-and-socket joints, in terms of the maximum permissible loads, minimumization of the friction torque, zero clearance, low elasticity, and high temperature resistance in the course of the further development of components for motor vehicles and the technical as well as economic optimization of such components.

SUMMARY AND OBJECTS OF THE INVENTION

Accordingly, it is an object of the present invention to improve the function of the lubricant grooves and thus to achieve improved lubrication in ball-and-socket joints for motor vehicles and more particularly to a joint ball provided on a pivot pin in a sliding shell made of plastic which joint ball is mounted movably, wherein the inner surface of the sliding shell is provided with grooves receiving lubricant and is inserted into a housing, the inner wall of which closely surrounds and supports the outer wall of the sliding shell.

According to the invention a solution to the prior art problems is achieved by providing flat recesses, which permit radial deformation of the sliding shell in the direction toward the housing. These flat recesses are provided on the outer side of the sliding shell in the area of grooves receiving the lubricant, disposed between the joint ball and the sliding shell.

This solution is based on the discovery that friction torques in the ball-and-socket joint, measured under tensile load, can be considered to be nearly constant as a function of the angle of rotation up to a certain tensile load threshold. The torques begin to increase continuously and approach asymptotically the torque level of dry lubrication only when this tensile load threshold is exceeded. This can be attributed to the continuous breakdown and displacement of the lubricant from the bearing zone of the ball-and-socket joint.

The flat recesses in the zone of the grooves receiving the lubricant partially enable a radial deformation of the sliding shell in the direction toward the housing, so that thickened edges of the ball socket at the grooves or slots are no longer able to abruptly affect the surface pressure of the joint ball and the joint socket. The grease-stripping effect of this thickened area is thus eliminated in favor of a uniform lubrication of the ball-and-socket joint even under the highest loads. The design according to the present invention consequently represents a further step in the technical and economic optimization of a ball-and-socket joint for motor vehicles, which has a higher load-bearing capacity and minimized friction torque compared with prior-art designs.

Flat recesses are provided preferably on the outer jacket of the sliding shell in the zone of the grooves provided inside said sliding shell. This does not rule out the possibility that recesses provided on the inner surface of the housing can have an analogous effect, but such a design is not meaningful for manufacturing reasons. The recesses may be designed as flat calotte segments with a flat, concave, or convex base.

A further object of the invention is to provide a ball-andsocket joint which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

BRIEF DESCRIPTION OF THE DRAWINGS

In the drawings:

FIG. 1 is a side view showing a ball-and-socket joint partly in cross section;

FIG. 2 is a cross sectional view showing a polar plane of a joint socket;

FIG. 3 is a cross sectional view showing taken along line III—III of FIG. 2;

FIG. 4 is a sectional schematic view of the sliding shell and housing of the invention with an accompanying diagram of the surface pressure in the bearing zone of a ball-and-socket joint; according to the invention and that according to the prior art and, FIG. 5 is a partial sectional view taken through a ball-and-socket joint according to the invention which is represented on a larger scale than in FIG. 1.

DESCRIPTION OF THE PREFERRED EMBODIMENT

According to the invention, the joint ball 1 is provided at one end of a pivot pin 2, the other end of which has a threaded pin 3 for fastening. The joint ball 1 is inserted with a sliding shell 4 made of plastic into a housing 5. The open side of the housing is covered by a cover 6. An elastic pad 7 or another resilient means provides for clearance-free seating of the joint ball 1 in the sliding shell 4. The sliding shell 4 is provided with lubricant grooves 8 on its inner jacket side. Above all, the grooves should be provided in the half which is the principal load-bearing half and which is turned away from the open side of the housing. The grooves 8 extend peripherally only over part of the inner circumference of the sliding sleeve 4, and thus the grooves 8 do not pass through to the edge of the sliding sleeve, so that the lubricating grease introduced into the grooves 8 cannot be removed from the sliding shell to the outside. In the zone of these grooves 8, substantially flattened areas or flattened recesses 9 are provided on the outer surface of the sliding shell 4, as is seen especially in the representation in FIG. 5, which is shown on a larger scale than in FIGS. 1 through 3. These substantially flattened areas 9 permit the material of the sliding shell 4 to perform a small radial evading movement or to deform and move radially, so that increased surface pressures are no longer able to develop in the area of the edges of the grooves 8. FIG. 4 shows schematically the sliding shell 4 and housing 5 and the changes in surface pressure in the area affected by the present invention. With conventional ball-and-socket joints the surface pressure increases continuously to a maximum on both sides of the grooves. In FIG. 4, the curve describing the surface pressure on the joint having the characteristics of the present invention is shown by phantom line 10. The peak values appearing at the edges of the grooves 8 in conventional joints are also shown for comparison in FIG. 4 by line 11. Better distribution of the lubricant from the grooves is achieved due to the fact that peak values in the surface pressure at the edges of the grooves 8 are avoided. The distribution of the lubricant is indicated by arrows 12 in FIG. 5. This figure also shows as an example the surface contour of the substantially flattened areas or flattened recesses 9 in broken lines. In the state before assembly, the substantially flattened areas 9 of the sliding shell 4 may form a flat surface or plane, or a convex or concave curved surface, accordingly in the latter case, the radius of curvature of the substantially flattened area differs from the radius of curvature of the wall of the sliding shell 4.

While a specific embodiment of the invention has been shown and described in detail to illustrate the application of the principals of the invention, it will be understood that the invention may be embodied otherwise without departing from such principals.

What is claimed is:

1. Ball-and-socket joint for motor vehicles, comprising: a joint ball; a pivot pin connected to said ball joint; a sliding shell made of plastic, said joint ball being mounted movably in said sliding shell, said sliding shell having an inner surface provided with a zone with grooves receiving lubricant; a housing having an inner wall defining a space receiving said sliding shell, said housing closely surrounding and supporting an outer wall of said sliding shell; flat recess means, including substantially flattened areas formed between said inner surface of said sliding shell and the inner wall of said housing for permitting radial deformation of the sliding shell in the direction toward the housing, said flattened areas being provided in said zone of the grooves receiving the lubricant.

2. Ball-and-socket joint according to claim 1, wherein the sliding shell substantially flattened areas are provided on said inner surface of the sliding shell.

3. Ball-and-socket joint according to claim 1 wherein the substantially flattened areas have a curved edge portion with a radius of curvature different from a radius of curvature of an outer jacket of the sliding shell.

4. Ball-and-socket joint for motor vehicles, comprising: a joint ball; a pivot pin connected to said ball joint; a sliding shell made of plastic, said joint ball being mounted movably in said sliding shell, said sliding shell having a surface provided with a zone having grooves receiving lubricant; a housing having an inner wall defining a space receiving said sliding shell, said housing closely surrounding and supporting an outer wall of said sliding shell; flat recesses means, including substantially flat areas formed on one of said inner surface of said sliding shell and an outer surface of said sliding shell for permitting radial deformation of the sliding shell in the direction toward the housing, said substantially flat areas being provided on a site of said sliding shell substantially opposite said zone having grooves receiving the lubricant.

5. Ball-and-socket joint for motor vehicles, comprising: a joint ball; a pivot pin connected to said ball joint; a sliding shell made of plastic, said joint ball being mounted movably in said sliding shell, said sliding shell having an inner surface provided with a zone having grooves receiving lubricant facing said joint ball; a housing having an inner wall defining a space receiving said sliding shell, said housing closely surrounding and supporting an outer wall of said sliding shell; flat recesses means, including substantially flat areas formed on said outer surface of said sliding shell for permitting radial movement of the sliding shell in the direction toward the housing, said substantially flat areas being provided on a site of said sliding shell substantially opposite said zone having grooves receiving the lubricant.

* * * * *